(12) United States Patent
Kobayashi

(10) Patent No.: US 12,024,113 B2
(45) Date of Patent: Jul. 2, 2024

(54) AIRBAG ATTACHMENT STRUCTURE

(71) Applicant: Marelli Corporation, Saitama (JP)

(72) Inventor: Yousuke Kobayashi, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 18/278,935

(22) PCT Filed: Jul. 14, 2022

(86) PCT No.: PCT/JP2022/027663
§ 371 (c)(1),
(2) Date: Aug. 25, 2023

(87) PCT Pub. No.: WO2023/021894
PCT Pub. Date: Feb. 23, 2023

(65) Prior Publication Data
US 2024/0149822 A1 May 9, 2024

(30) Foreign Application Priority Data
Aug. 16, 2021 (JP) ................................. 2021-132385

(51) Int. Cl.
*B60R 21/215* (2011.01)
*B60R 21/205* (2011.01)

(52) U.S. Cl.
CPC .......... *B60R 21/215* (2013.01); *B60R 21/205* (2013.01); *B60R 2021/21537* (2013.01)

(58) Field of Classification Search
CPC . B60R 21/205; B60R 21/215; B60R 21/2165; B60R 21/206; B60R 2021/21537; B60R 2021/161; B60R 2021/23169

USPC ............................................... 280/732, 728.3
See application file for complete search history.

(56) References Cited

U.S. PATENT DOCUMENTS

| 5,609,355 | A | 3/1997 | Smydra et al. |
| 8,424,905 | B2 * | 4/2013 | Brunet .................. B60R 21/206 |
| | | | 280/728.3 |
| 11,235,726 | B2 * | 2/2022 | An ........................ B60R 21/235 |

(Continued)

FOREIGN PATENT DOCUMENTS

CN 210363714 U * 4/2020
EP 2750935 B1 9/2015

(Continued)

*Primary Examiner* — Keith J Frisby
(74) *Attorney, Agent, or Firm* — Young Basile Hanlon & MacFarlane, P.C.

(57) ABSTRACT

An airbag attachment structure includes: a door portion whose one end portion is opened when an airbag is deployed; an attachment portion to which an airbag case for storing the airbag is attached, and which has an opening at which the door portion is opened and brought into an opened state when the airbag is deployed; a hinge portion configured to turnably hold the door portion; a guide portion protruding from the attachment portion to narrow a deployment passage between the airbag and the door portion, and configured to guide deployment of the airbag; and a flap connected to the guide portion, interposed between the airbag and the hinge portion, and configured to turn together with the door portion when being biased by the airbag during deployment of the airbag, and the guide portion has higher rigidity than the flap.

11 Claims, 9 Drawing Sheets

(56) References Cited

U.S. PATENT DOCUMENTS

| | | | |
|---|---|---|---|
| 2005/0269804 A1* | 12/2005 | Yamada | B29C 66/532 |
| | | | 428/156 |
| 2014/0203540 A1 | 7/2014 | Edeline | |
| 2018/0345898 A1* | 12/2018 | An | B60R 21/217 |
| 2020/0238940 A1* | 7/2020 | Swiniarski | B60R 21/2165 |
| 2021/0261082 A1* | 8/2021 | Kobayashi | B60R 21/215 |

FOREIGN PATENT DOCUMENTS

| | | | |
|---|---|---|---|
| JP | 2004-231027 A | | 8/2004 |
| JP | 2006062420 A | * | 3/2006 |
| JP | 2008-081005 A | | 4/2008 |
| JP | 2009-143474 A | | 7/2009 |
| JP | 2009-227210 A | | 10/2009 |
| JP | 2015-085804 A | | 5/2015 |
| KR | 10-2012-0058155 A | | 6/2012 |
| WO | 2007/128921 A1 | | 11/2007 |

* cited by examiner

AIRBAG ATTACHMENT STRUCTURE

CROSS-REFERENCE TO RELATED APPLICATIONS

This application is a national phase 371 of International Application Serial No. PCT/JP2022/027663, filed on Jul. 14, 2022, which claims priority to Japanese Patent Application Serial No. 2021-132385, filed Aug. 16, 2021, the entire contents of which are incorporated herein by reference.

TECHNICAL FIELD

The present invention relates to an airbag attachment structure.

BACKGROUND ART

EP2750935B1 discloses a vehicle safety device that includes a door connected to a support frame via a hinge, and a deflector provided between the door and an airbag and configured to protect the hinge during deployment of the airbag. In the vehicle safety device, when an inflator of the airbag operates, the airbag is first inflated in a space below the door. Then, a pressure generated due to the inflation of the airbag acts, a cleavage line formed at an instrument panel is cleaved, and the door rotates around the hinge. Accordingly, the airbag is expanded toward an occupant.

SUMMARY OF INVENTION

Further, in the vehicle safety device in EP2750935B1, the deflector for protecting the hinge is molded integrally with the hinge. That is, the deflector is formed using the same material and has the same thickness as the elastic hinge. Therefore, when the airbag is inflated in the space below the door, the deflector is bent. In this case, a sufficient pressure is applied to a position of the cleavage line, but a delay accordingly occurs. That is, at a position where there is no cleavage line (more accurately, a position different from a position at which the cleavage line is first cleaved), a pressure to be applied to the cleavage line is dispersed by an amount of the inflation of the airbag.

An object of the invention is to facilitate concentration of a pressure on a position of a cleavage line (a position at which a cleavage line is first cleaved) when an airbag in a deployment passage below a door portion is inflated.

According to an aspect of the present invention, an airbag attachment structure for attaching an airbag to an instrument panel, the airbag attachment structure includes: a door portion whose at least one end portion is provided along a cleavage line of the instrument panel, and in which the one end portion is opened when the airbag is deployed; an attachment portion to which an airbag case for storing the airbag is attached, and which has an opening at which the door portion is opened and brought into an opened state when the airbag is deployed; a hinge portion connected to the attachment portion and configured to turnably hold the door portion; a guide portion protruding from the attachment portion to narrow a deployment passage between the airbag and the door portion, and configured to guide deployment of the airbag; and a flap connected to the guide portion, interposed between the airbag and the hinge portion, and configured to turn together with the door portion when being biased by the airbag during deployment of the airbag, wherein the guide portion has higher rigidity than the flap.

According to the above aspect, a guide portion provided to protrude from an attachment portion to narrow the deployment passage has higher rigidity than a flap. Therefore, when the airbag is inflated, the guide portion having higher rigidity reduces a volume of the deployment passage, so that the pressure can be easily concentrated on the position of the cleavage line by the inflation of the airbag.

DESCRIPTION OF EMBODIMENTS

Hereinafter, an airbag attachment structure 10 according to an embodiment of the invention will be described with reference to the accompanying drawings.

Figure 1:
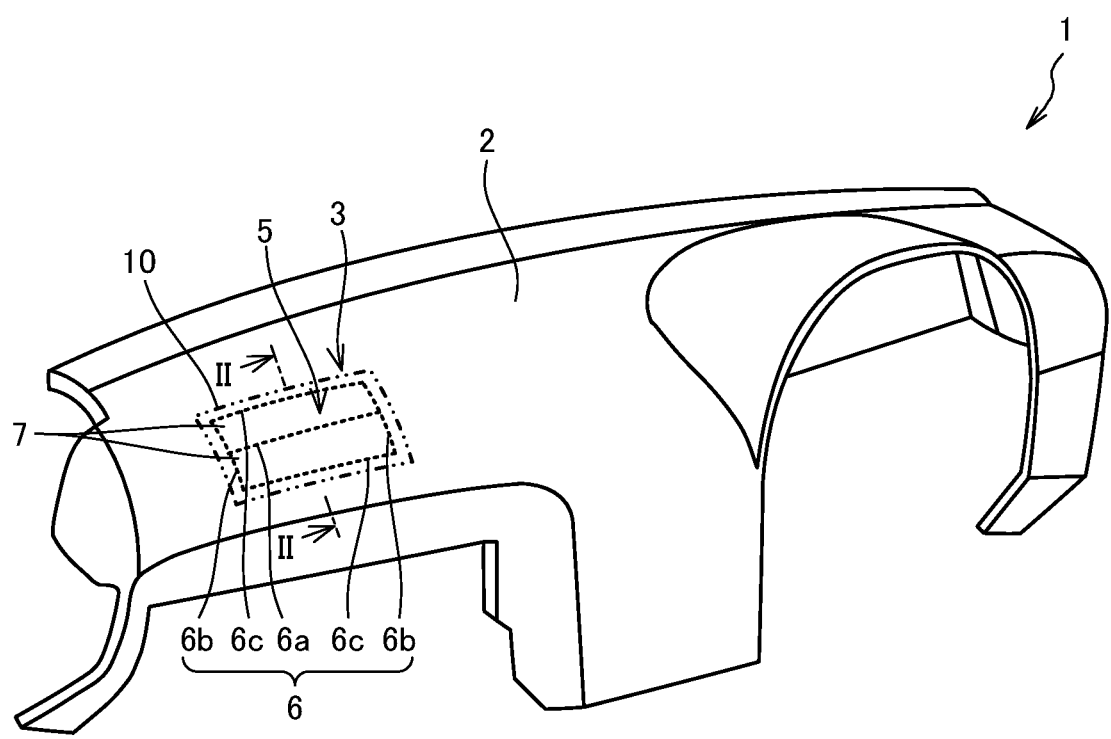
FIG. 1 is a perspective view of an instrument panel to which an airbag attachment structure according to an embodiment of the invention is applied.
Figure 2:
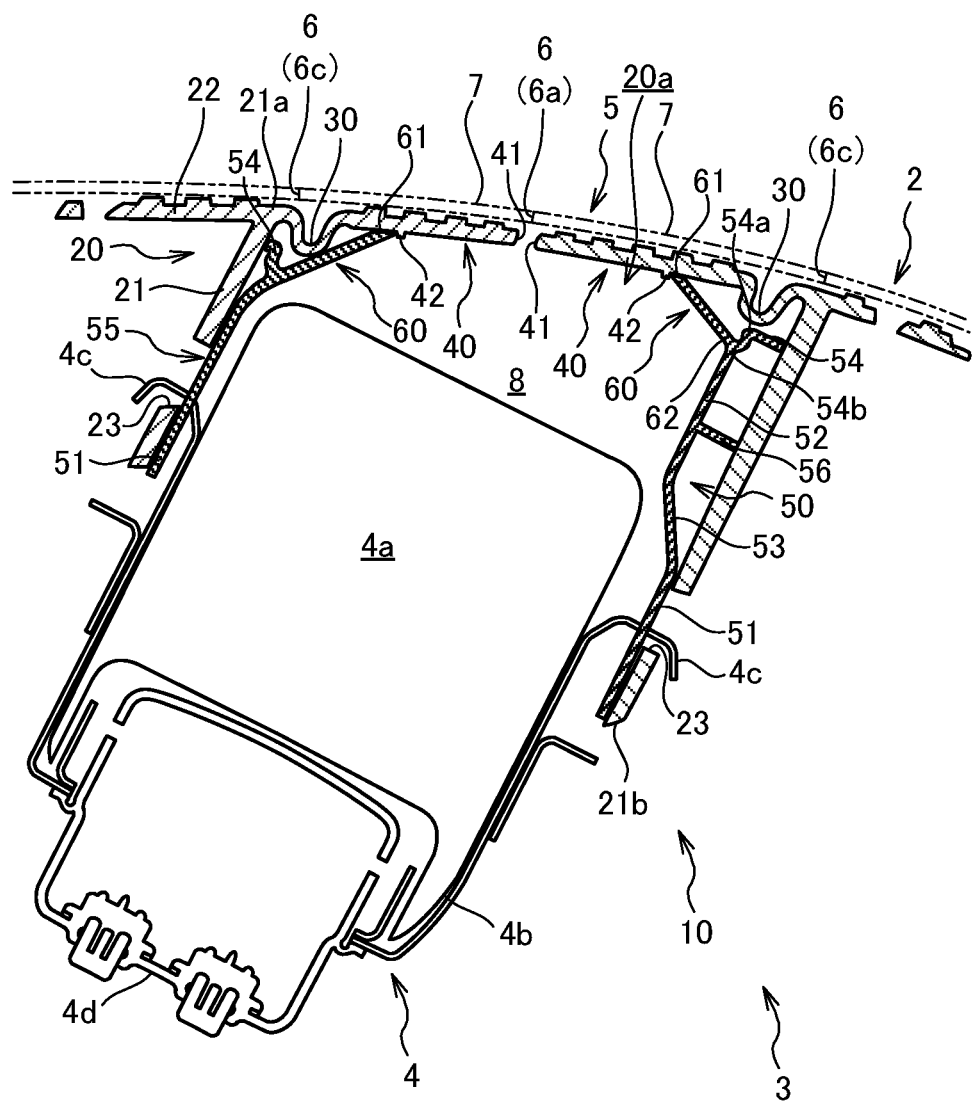
FIG. 2 is a view corresponding to a cross section taken along a line II-II in FIG. 1, and is a cross-sectional view illustrating the airbag attachment structure.

First, an instrument panel 2 of a vehicle 1 such as an automobile to which the airbag attachment structure 10 is applied will be described with reference to FIGS. 1 and 2. FIG. 1 is a perspective view of the instrument panel 2. FIG. 2 is a view corresponding to a cross section taken along a line II-II in FIG. 1, and is a cross-sectional view illustrating the airbag attachment structure 10.

As illustrated in FIG. 1, the instrument panel 2 is provided at a front part of a vehicle cabin of the vehicle 1. The vehicle 1 includes an airbag device 3.

The airbag device 3 is a safety device for protecting an occupant in an emergency such as a collision of the vehicle 1. The airbag device 3 is provided at a part of the instrument panel 2 on a front passenger seat side, and protects an occupant sitting on a front passenger seat. The airbag device 3 includes an airbag module 4 (see FIG. 2), an airbag lid 5, and the airbag attachment structure 10.

Examples of the airbag device 3 include an airbag for a driver seat, an airbag for a front passenger seat, a side airbag, and a curtain airbag. In the present embodiment, the airbag device 3 is an airbag for a front passenger seat.

As illustrated in FIG. 2, the airbag module 4 includes an airbag 4a, an airbag case 4b, a plurality of hooks 4c, and an inflator 4d.

The airbag 4a is formed in a bag shape, and is folded and stored in the airbag case 4b. The airbag 4a is deployed and inflated in an emergency. The plurality of hooks 4c fix the airbag case 4b to the instrument panel 2. The inflator 4d generates gas for deploying and inflating the airbag 4a.

As illustrated in FIG. 1, the airbag lid 5 is provided at the part of the instrument panel 2 on the front passenger seat side. Examples of the airbag lid 5 include an integral type airbag lid integrally provided with the instrument panel 2, a separated type airbag lid provided separately from the instrument panel 2 and attached to the instrument panel 2. In the present embodiment, the airbag lid 5 is an integral type airbag lid and constitutes a part of the instrument panel 2.

Normally, the airbag lid 5 covers the airbag module 4 from a front surface. The airbag lid 5 has a cleavage line 6. In an emergency, the airbag lid 5 is cleaved from the cleavage line 6 by a pressing force generated by the deployed and inflated airbag 4a, and an opening for the airbag 4a to expand into the vehicle cabin is formed.

The cleavage line 6 is formed in a recessed shape from a back surface of the airbag lid 5 and has a groove shape that does not reach the front surface of the airbag lid 5. The cleavage line 6 is provided in a substantially H shape and includes a lateral cleavage line portion 6a extending substantially in a vehicle width direction, and left and right vertical cleavage line portions 6b extending substantially in a vehicle longitudinal direction from both end portions of the lateral cleavage line portion 6a. In the present embodiment, the cleavage line 6 further includes a pair of lateral cleavage line portions 6c each connecting corresponding end portions of the vertical cleavage line portions 6b. In the airbag lid 5, a pair of opening and closing portions 7 by which the opening can be formed are defined by the cleavage line 6. The lateral cleavage line portion 6a is located at a position to be first cleaved in the substantially H-shaped cleavage line 6.

Figure 3:
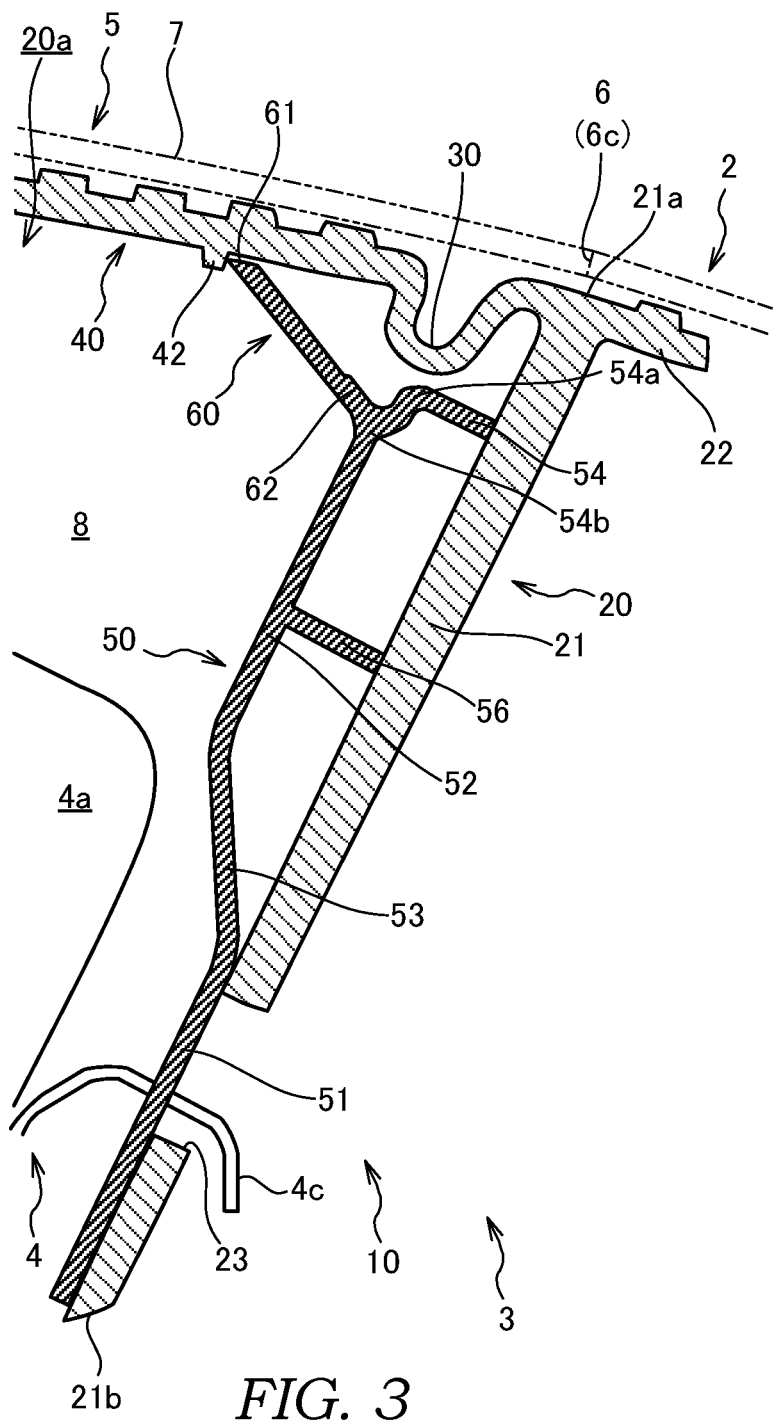
FIG. 3 is an enlarged view of a vicinity of a guide portion in FIG. 2.
Figure 4:
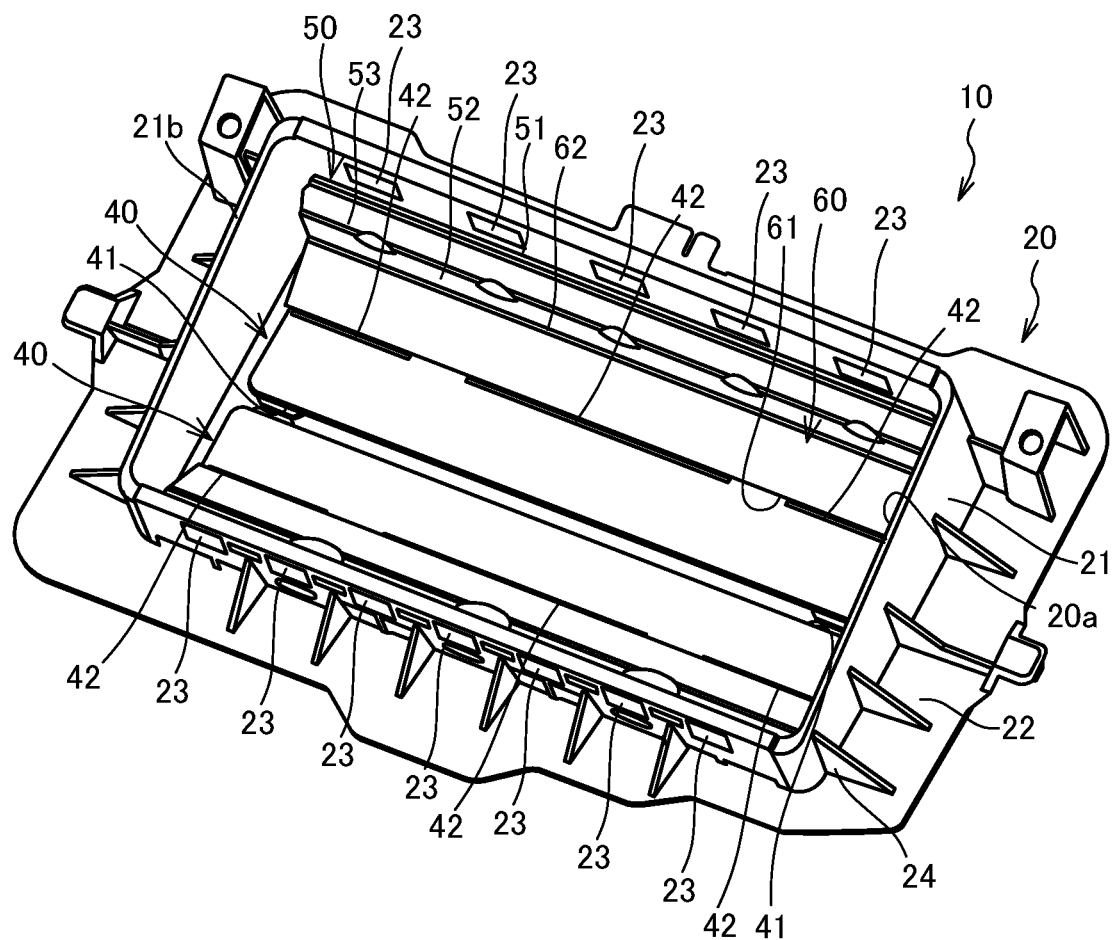
FIG. 4 is a perspective view illustrating the airbag attachment structure as viewed from a back surface.
Figure 5:
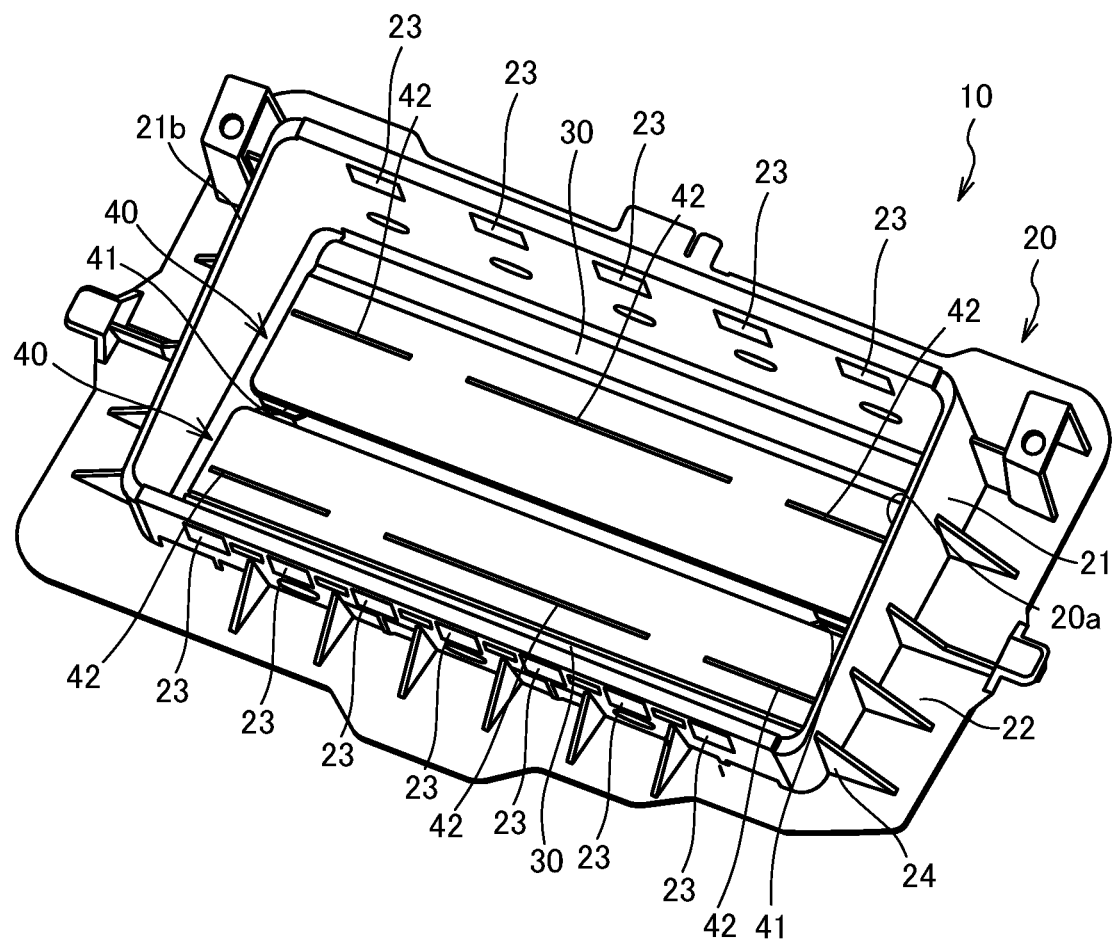
FIG. 5 is a perspective view illustrating a state where the guide portions and flaps are removed from the airbag attachment structure in FIG. 4.
Figure 6:
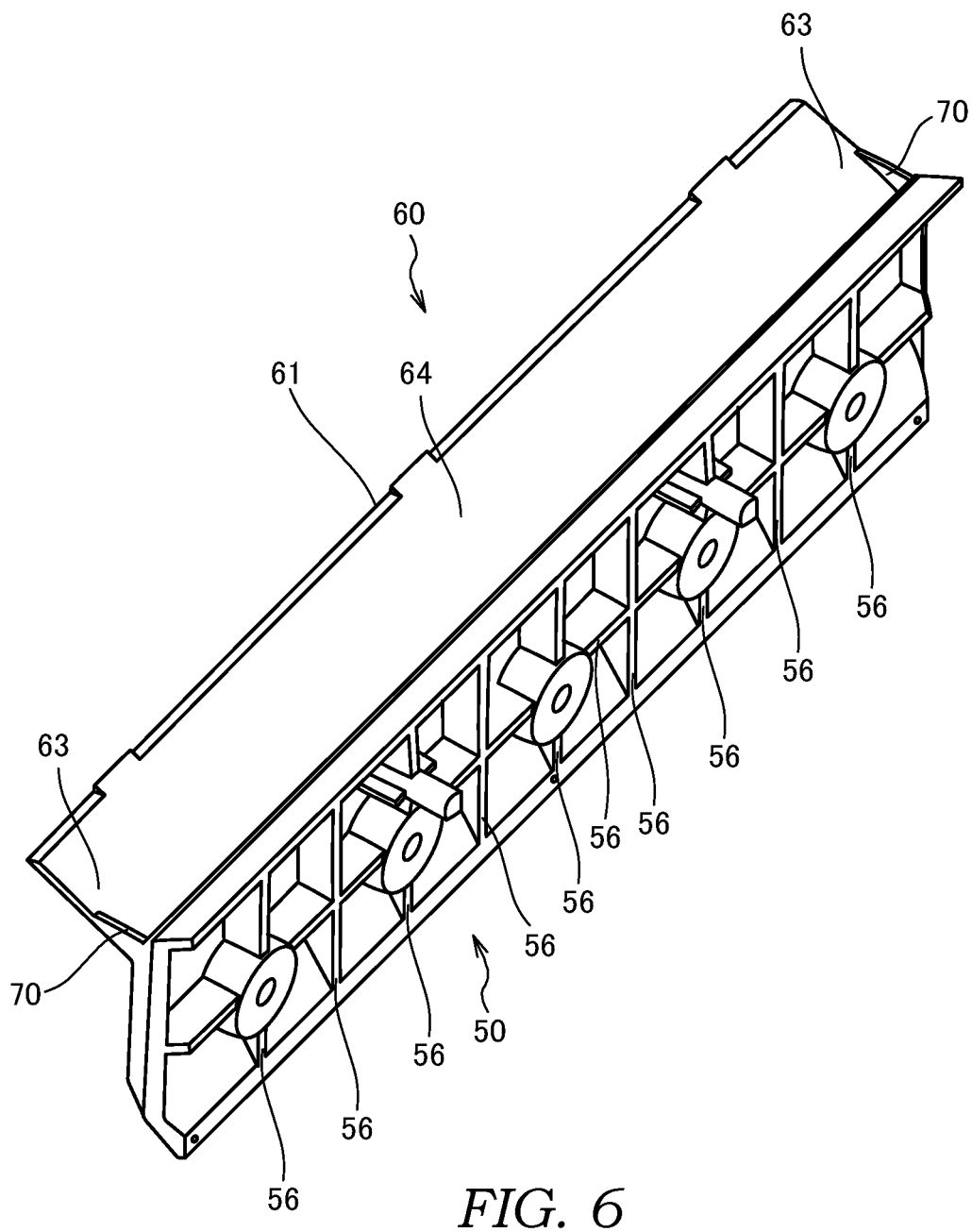
FIG. 6 is a perspective view of the guide portion and the flap.

Next, the airbag attachment structure 10 will be described with reference to FIGS. 3 to 6. FIG. 3 is an enlarged view of a vicinity of a guide portion 50 in FIG. 2. FIG. 4 is a perspective view illustrating the airbag attachment structure 10 from a back surface. FIG. 5 is a perspective view illustrating a state where the guide portion 50 and flaps 60 are removed from the airbag attachment structure 10 in FIG. 4. FIG. 6 is a perspective view of the guide portion 50 and the flap 60.

As illustrated in FIG. 2, the airbag attachment structure 10 is a structure for attaching the airbag 4a to the instrument panel 2. The airbag attachment structure 10 includes an attachment portion 20, a pair of hinge portions 30, a pair of door portions 40, the guide portion 50, and the flaps 60.

The attachment portion 20 is molded using a resin material. The attachment portion 20 has an opening 20a at which the door portions 40 are opened and brought into an opened state when the airbag 4a is deployed. The airbag case 4b for storing the airbag 4a is attached to the attachment portion 20 via the hooks 4c. The attachment portion 20 includes a main body 21, a flange portion 22, through holes 23, and a plurality of reinforcing ribs 24 (see FIGS. 4 and 5).

As illustrated in FIGS. 4 and 5, the main body 21 is formed in a substantially rectangular tubular shape. As illustrated in FIG. 2, the opening 20a is formed at one end portion 21a of the main body 21. The airbag module 4 is attached to the other end portion 21b of the main body 21.

The flange portion 22 is formed at an outer periphery of the one end portion 21a of the main body 21 over the whole outer periphery. As illustrated in FIG. 2, the flange portion 22 is attached to abut against a back surface of the instrument panel 2. The flange portion 22 is welded to the back surface of the instrument panel 2 to reinforce the instrument panel 2.

The through holes 23 penetrates the main body 21 in a thickness direction thereof. The hooks 4c of the airbag module 4 are hooked into the through holes 23. Accordingly, the airbag module 4 is attached to the attachment portion 20.

As illustrated in FIGS. 4 and 5, the plurality of reinforcing ribs 24 are arranged to an outer periphery of the flange portion 22 at intervals from each other. The reinforcing ribs 24 connect and reinforce the main body 21 and the flange portion 22.

As illustrated in FIG. 2, the hinge portions 30 are provided to turnably hold the respective door portions 40. The hinge portions 30 are integrally molded with the door portions 40 and the attachment portion 20. Each of the hinge portions 30 is formed to protrude to an inner side of the opening 20a (inside a deployment passage 8) so as to have a substantially U-shaped cross section. When the airbag 4a is deployed and the door portions 40 are opened, each of the hinge portions 30 rotates with a connection point with the attachment portion 20 as a starting point while a part having the substantially U-shaped cross section is extending from the opening 20a to the outside. Here, the deployment passage 8 means a space surrounded by the door portions 40, the airbag 4a, and the attachment portion 20. The airbag 4a provided in the deployment passage 8 is inclinedly attached to the attachment portion 20 such that a distance to one of the hinge portions 30 is larger than a distance to the other of the hinge portions 30. That is, the airbag 4a is attached to the attachment portion 20 in a state where a deploying direction is not perpendicular to the door portions 40 but is inclined with respect to the door portions 40.

The door portions 40 are integrally molded with the attachment portion 20 and the hinge portions 30. One end portion 41 of each of the door portions 40 is provided along the lateral cleavage line portion 6a of the instrument panel 2. That is, each of the door portions 40 is provided such that at least the one end portion 41 is along the cleavage line 6 of the instrument panel 2. Each of the door portions 40 is provided such that side end portions at both ends of the one end portion 41 are along the vertical cleavage line portions 6b of the instrument panel 2. The door portions 40 are attached to abut against a back surface of the airbag lid 5. The door portions 40 are welded to the back surface of the airbag lid 5 to reinforce the airbag lid 5.

The pair of door portions 40 are provided such that the one end portions 41, which are free ends of the pair of door portions 40, face each other on an inner side of the lateral cleavage line portion 6a. When the airbag 4a is deployed, each of the door portions 40 is opened such that the one end portion 41 turns around the corresponding hinge portion 30. Each of the door portions 40 includes a free end stopper 42.

Each of the free end stoppers 42 extends along an axial direction of a rotating shaft in each of the hinge portions 30 (also referred to as an extending direction in which each of the hinge portions 30 extend, and is a width direction of the vehicle 1 in a state where the airbag attachment structure 10 is mounted in front of the front passenger seat of the vehicle 1). As illustrated in FIG. 4, a free end 61 of each of the flaps 60 is abutted against the corresponding free end stopper 42 in a state where the airbag 4a is stored, that is, a state before the airbag 4a is deployed. Each of the free end stoppers 42 defines a position of the corresponding free end 61.

As illustrated in FIG. 2, the guide portion 50 is provided to protrude from the main body 21 of the attachment portion 20 to the deployment passage 8. The guide portion 50 guides the deployment of the airbag 4a while reducing a volume of the deployment passage 8. The guide portion 50 is molded using a resin material. The guide portion 50 includes a plane portion 51, a protruding portion 52, an inclined portion 53, and a tip portion 54.

Here, as described above, the airbag 4a provided in the deployment passage 8 is inclinedly attached to the attachment portion 20 such that the distance to one of the hinge portions 30 is larger than the distance to the other of the hinge portions 30. Therefore, a space easily occurs between the airbag 4a and the hinge portion 30.

On the other hand, in the airbag attachment structure 10, the guide portion 50 is attached at a position where the hinge portion 30 having the larger distance to the airbag 4a in the attachment portion 20 is connected. In this way, by using the guide portion 50 to fill the space between the airbag 4a and the hinge portion 30, a pressure can be concentrated on the cleavage line (the lateral cleavage line portion 6a) when the airbag 4a is inflated in the deployment passage 8.

Further, since the guide portion 50 and the flap 60 are provided, an area in which the airbag 4a is abutted against back surfaces of the door portions 40 is reduced, so that the pressure can be easily concentrated on the cleavage line (the lateral cleavage line portion 6a) when the airbag 4a is inflated in the deployment passage 8.

The guide portion 50 has higher rigidity than the flap 60. Here, the rigidity is the difficulty of deformation (magnitude of a deformation amount) when the airbag 4a is deployed and inflated and a pressure in the deployment passage 8 increases. That is, when the airbag 4a comes into contact with the guide portion 50 and the flaps 60 in a state where an internal pressure of the airbag 4a is increased in the deployment passage 8, the guide portion 50 is less likely to be deformed as compared with the flap 60 (the deformation amount is small). The guide portion 50 includes reinforcing ribs 56 on a back surface that does not face the deployment passage 8. Accordingly, the rigidity of the guide portion 50 increases (see FIG. 6).

As illustrated in FIG. 2, the guide portion 50 is provided separately from the attachment portion 20 and is attached to the attachment portion 20. Therefore, the guide portion 50 can be molded separately from the attachment portion 20 integrally molded with the hinge portions 30. Therefore, for example, the attachment portion 20 and the guide portion 50 can be formed using different materials and can be formed to have different thicknesses, so that it is easy to increase the rigidity of the guide portion 50.

As illustrated in FIG. 3, the plane portion 51 is provided along the attachment portion 20 and is attached to the attachment portion 20. The plane portion 51 has, at positions overlapping with the through holes 23 of the attachment portion 20, through holes (not shown) through which the hooks 4c of the airbag module 4 are inserted.

The protruding portion 52 protrudes from the attachment portion 20 to narrow the deployment passage 8 between the airbag 4a and the door portions 40. The protruding portion 52 protrudes inward from the attachment portion 20 in a range not overlapping with the airbag 4a when the airbag 4a is viewed from the opening 20a. Therefore, during attachment of the airbag 4a, it is possible to prevent the guide portion 50 from interfering with the airbag 4a.

The inclined portion 53 connects an upper end of the plane portion 51 and a lower end of the protruding portion 52. The inclined portion 53 is inclined such that the deployment passage 8 is gradually narrowed from a connecting portion with the plane portion 51 toward a connecting portion with the protruding portion 52.

The tip portion 54 is provided at an upper end of the guide portion 50. The tip portion 54 extends from an upper end of the protruding portion 52, and connects the protruding portion 52 and the attachment portion 20. The tip portion 54 is provided substantially perpendicular to the attachment portion 20. An inner peripheral end portion 54a of the tip portion 54 on an inner peripheral side of the deployment passage 8 is provided on an outer peripheral side (a position close to the main body 21) of the deployment passage 8 with respect to a connection point 54b where the flap 60 is connected.

The inner peripheral end portion 54a functions as a turning stopper when the flap 60 turns. Accordingly, it is possible to prevent the flap 60 from turning more than necessary and prevent a load from being applied to the turning shaft of the flap 60 (the connection point 54b where the flap 60 is connected to the guide portion 50), thereby preventing the flap 60 from being damaged. In the present embodiment, the inner peripheral end portion 54a functions as the turning stopper, but the invention is not limited thereto, the turning stopper may be a projection portion protruding from the tip portion 54 toward the flap 60, or the like. That is, a shape and an arrangement of the turning stopper are not particularly limited from the viewpoint of function.

The inner peripheral end portion 54a is provided at a position away from the connection point 54b between the flap 60 and the guide portion 50 by a predetermined distance outward in the deploying direction of the airbag 4a. The predetermined distance is a distance at least corresponding to the thickness of the flap 60. That is, the tip portion 54 is located closer to the attachment portion 20 than the connection point 54b between the flap 60 and the guide portion 50. Specifically, the tip portion 54 is located closer to the attachment portion 20 than the connection point 54b by at least an amount corresponding to the thickness of the flap 60.

Accordingly, an amount of protrusion of the flap 60 into the deployment passage 8 is reduced in a state where the flap 60 is folded when the flap 60 turns and abuts against the inner peripheral end portion 54a (the turning stopper) of the tip portion 54 of the guide portion 50. Accordingly, it is possible to prevent the connection point 54b at the flap 60 from interfering with the inflated airbag 4a.

The flap 60 is integrally molded with the guide portion 50. Instead, the guide portion 50 and the flap 60 may be separately formed and assembled. In this case, by molding the guide portion 50 and the flap 60 using different materials or to have different thicknesses, the rigidity of the guide portion 50 can be made higher than that of the flap 60.

The flap 60 is connected to the guide portion 50 and is interposed between the airbag 4a and the hinge portion 30. The flap 60 extends along the extending direction in which the hinge portion 30 extends. The flap 60 includes the free end 61, an abutting portion 62, and a pair of ribs 70 (see FIG. 6).

The flap 60 is biased and bent by the airbag 4a during deployment of the airbag 4a, and turns together with the corresponding door portion 40 around the connection point 54b when the airbag 4a is deployed. The flap 60 is connected to the guide portion 50 in the vicinity of the tip portion 54 of the guide portion 50 in the deploying direction of the airbag 4a.

Since the flaps 60 are provided between the airbag 4a and the hinge portions 30, when the airbag 4a is deployed, the pressure generated due to the inflation of the airbag 4a can be concentrated between the pair of door portions 40 (the lateral cleavage line portion 6a), and the damage to the hinge portions 30 can be prevented by preventing the airbag 4a from coming into direct contact with the rotating shafts of the hinge portions 30.

The connection point 54b between the flap 60 and the guide portion 50 is away from the tip portion 54 of the guide portion 50 by a predetermined distance. The predetermined distance is a distance smaller than a length of the abutting portion 62 of the flap 60.

Here, during deployment of the airbag 4a, when the inner peripheral end portion 54a of the guide portion 50 is at a position where the turning of the flap 60 cannot be restricted (that is, it is assumed that there is no turning stopper) in a state where the door portion 40 is sufficiently opened, there is a concern that a turning angle of the flap 60 becomes too large and a force that largely deforms the flap 60 acts.

In order to cope with the concern, in the airbag attachment structure 10, the flap 60 is connected to a position away from the tip portion 54 of the guide portion 50 by a predetermined distance. Therefore, when the flap 60 turns, the flap 60 abuts against the inner peripheral end portion 54a of the tip portion 54 of the guide portion 50, and the turning of the flap 60 is restricted. Therefore, the action of the force for largely deforming the flap 60 can be prevented.

The free end 61 abuts against the door portion 40 in a state where the airbag 4a is stored. When the free end 61 abuts against the free end stopper 42, a position thereof is defined.

In this way, since the free end 61 of the flap 60 abuts against the free end stopper 42, the position of the flap 60 can be defined as intended. Further, since the flaps 60 are restrained by the door portions 40, rattling noise when the flaps 60 move due to vibration during traveling of the vehicle 1 can be prevented from occurring.

The abutting portion 62 is formed over a predetermined length from the connection point 54b in the flap 60. The abutting portion 62 abuts against the inner peripheral end portion 54a of the tip portion 54 in the state where the airbag 4a is deployed. The abutting portion 62 is formed to be thicker than other portions of the flap 60.

In this way, when the airbag 4a is deployed and the flap 60 turns, the abutting portion 62 formed to be thicker than other portions of the flap 60 abuts against the inner peripheral end portion 54a of the tip portion 54 of the guide portion 50. Accordingly, it is possible to cope with a large force that acts on the flap 60 due to an impact when the flap 60 turns and abuts against the inner peripheral end portion 54a.

As illustrated in FIG. 6, the ribs 70 are provided at both end portions 63 of the flap 60 in an extending direction thereof (that is the same as the axial direction of the rotating shafts in the hinge portions 30 and is the width direction of the vehicle 1 when the airbag attachment structure 10 is mounted to the vehicle 1), and are connected to the guide portion 50. The ribs 70 reinforce the both end portions 63 of the flap 60 and makes the rigidity of the both end portions 63 to be higher than that of a center portion 64. In other words, the center portion 64 of the flap 60 is relatively brittle with respect to the both end portions 63. Here, each of the both end portions 63 indicates a region also including a position apart from each of both ends in the extending direction of the flap 60 by several millimeters.

Instead of providing the ribs 70, for example, the both end portions 63 of the flap 60 in the extending direction may be formed to be thicker than the center portion 64. That is, in the flap 60, the rigidity of the both end portions 63 in the axial direction during the turning may be higher than that of the center portion 64 between the both end portions 63.

As illustrated in FIG. 2, on a surface of the main body 21 facing a surface of the main body 21 where the guide portion 50 is provided, a guide portion 55 is provided rather than the guide portion 50. The guide portion 55 does not include the protruding portion 52 and the inclined portion 53, and only includes the plane portion 51 and the tip portion 54. Similar to the guide portion 50, one of the flaps 60 is connected to the guide portion 55. Instead, a pair of guide portions 50 may be provided on a pair of surfaces of the main body 21 facing each other.

Figure 7:
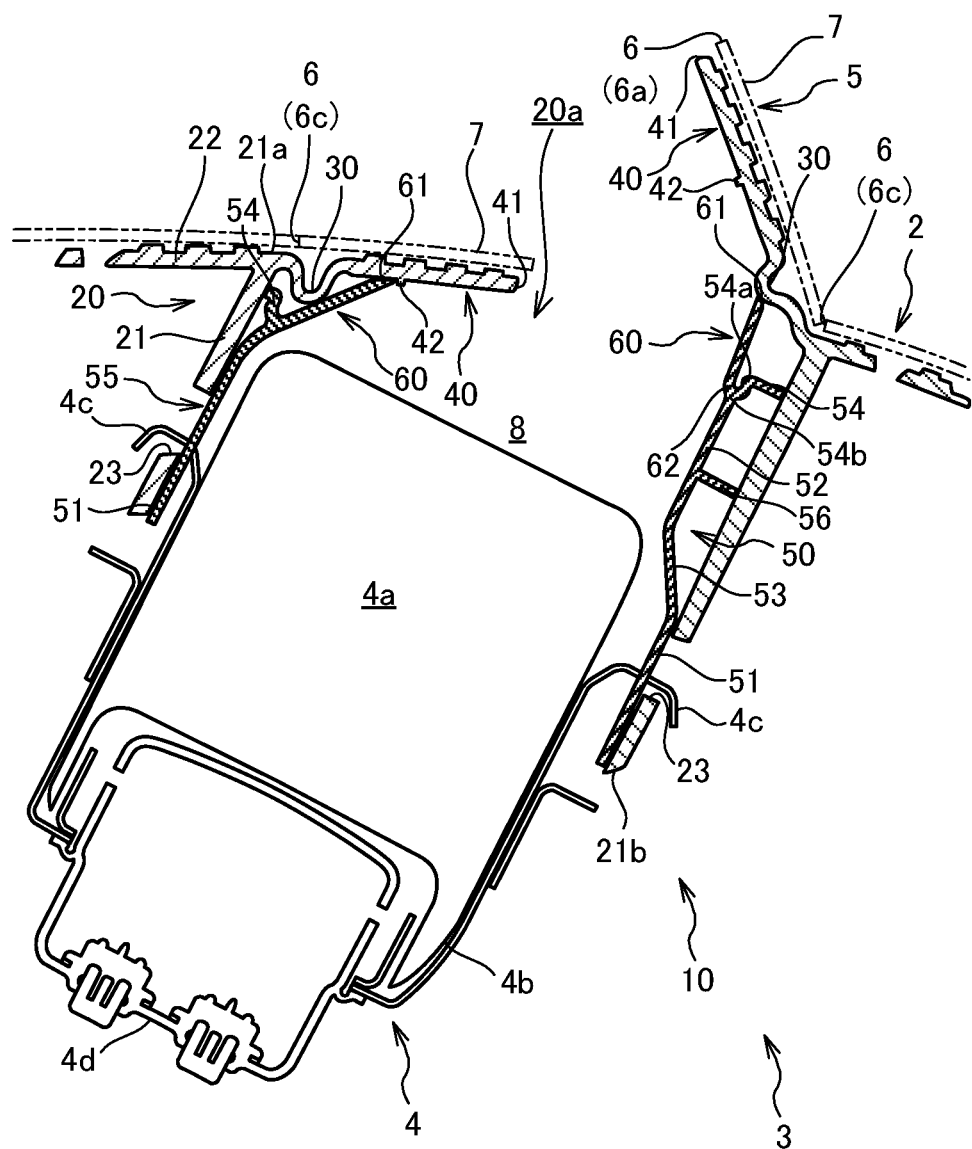
FIG. 7 is a cross-sectional view illustrating the airbag in a state in the middle of deployment.
Figure 8:
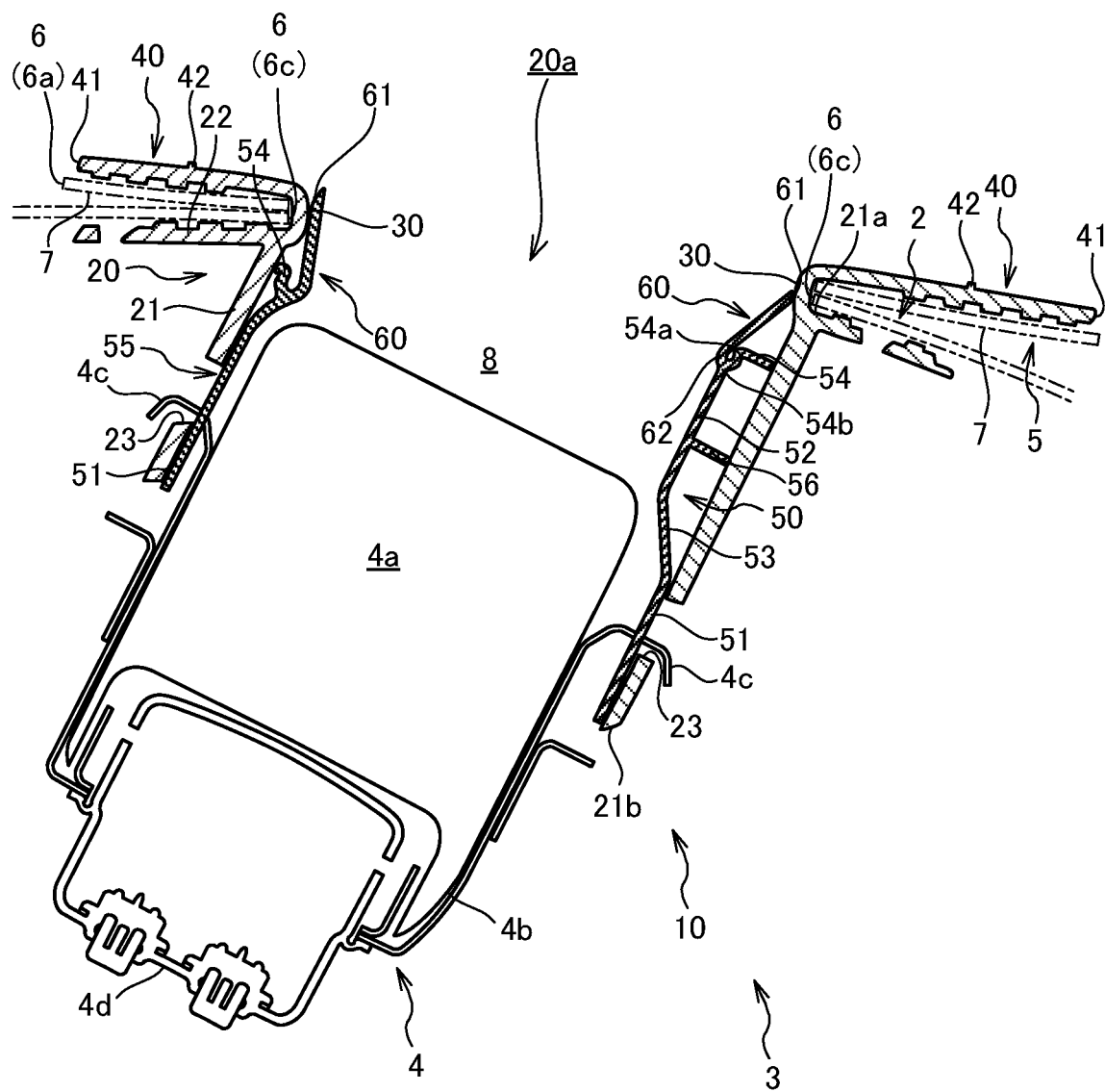
FIG. 8 is a cross-sectional view illustrating the airbag in a deployed state.

Next, operations of the airbag attachment structure 10 will be described with reference to FIGS. 7 and 8. FIG. 7 is a cross-sectional view illustrating the airbag 4a in a state in the middle of deployment. FIG. 8 is a cross-sectional view illustrating the airbag 4a in a deployed state.

In an emergency such as a collision of the vehicle 1, in response to a signal from a sensor (not shown) that detects the collision, the airbag device 3 operates to protect the occupant sitting on the front passenger seat. When the airbag device 3 operates, the airbag 4a is deployed and inflated by the gas generated by the inflator 4d so as to press the airbag lid 5.

Here, a case (comparative example) where no guide portion is provided and only the flaps are attached to the attachment portion will be discussed. In this case, the flaps are disposed in the deployment passage defined by an upper surface of the airbag and the main body of the attachment portion. When the airbag is deployed and inflated, the flaps are bent, and the pressure cannot be accordingly concentrated on a cleavage line portion between the door portions. In particular, when the flaps are attached to the attachment portion, the flaps are bent to rotate respectively with contact positions with the attachment portion, which serve as base portions of the flaps, as starting points, and thus a bending amount increases.

Meanwhile, in the airbag attachment structure 10, the guide portion 50 having higher rigidity than the flap 60 is provided to protrude from the attachment portion 20 to narrow the deployment passage 8, and the flap 60 is connected to the guide portion 50. Therefore, since the guide portion 50 having higher rigidity reduces the volume of the deployment passage 8, the pressure can be concentrated between the door portions 40 (the lateral cleavage line portion 6a) when the airbag 4a is inflated. Further, since the flap 60 is connected to the guide portion 50 protruding from the attachment portion 20, the flap 60 can be reduced in size. Therefore, as compared with the comparative example described above, the bending of the flap 60 is reduced by an amount corresponding to the reduction in size of the flap 60, so that the pressure when the airbag 4a is inflated is easily concentrated between the door portions 40.

When the airbag 4a is inflated and the pressure in the deployment passage 8 increases, the airbag lid 5 is cleaved from the cleavage line 6 and the opening and closing portions 7 are opened. The airbag 4a is further inflated toward the outside of the opening and closing portions 7 (toward the inside of the vehicle cabin), and restrains to protect the body of the occupant sitting on the front passenger seat.

Here, when the opening and closing portions 7 of the airbag lid 5 are opened, it is desirable that a vicinity of a center in the lateral cleavage line portion 6a is also first cleaved and then spreads to both ends, and after the lateral cleavage line portion 6a is cleaved, the vertical cleavage line portions 6b are cleaved (see FIG. 1). That is, it is desirable that in the airbag lid 5, the pair of opening and closing portions 7 are cleaved from the center and opened in directions opposite to each other (so-called double-door).

On the other hand, in the airbag attachment structure 10, the flaps 60 are provided between the airbag 4a and the hinge portions 30. Therefore, when the airbag 4a is deployed, the pressure generated due to the inflation of the airbag 4a can be concentrated and act between the pair of door portions 40 (the lateral cleavage line portion 6a), and it is possible to prevent the pressure from acting on the hinge portions 30. As described above, in the airbag attachment structure 10, when the pressure generated due to the inflation of the airbag 4a acts, the airbag lid 5 is cleaved from the lateral cleavage line portion 6a at the center.

The ribs 70 are provided at the both end portions 63 of the flap 60. By providing the ribs 70, the rigidity of the both end portions 63 of the flap 60 is higher than that of the center portion 64 of the flap 60. Therefore, the flap 60 is deformed first in a vicinity of the relatively brittle center portion 64, and then deformed in the vicinity of the both end portions 63.

Therefore, when the pressure generated due to the inflation of the airbag 4a acts, the airbag lid 5 is also first cleaved in the vicinity of the center in the lateral cleavage line portion 6a, then spreads to both ends, and after the lateral cleavage line portion 6a is cleaved, the vertical cleavage line portions 6b are cleaved. Therefore, in the airbag attachment structure 10, it is possible to cleave the cleavage line 6 in a desirable order and open the opening and closing portions 7 of the airbag lid 5 together with the door portions 40.

According to the embodiment described above, the following effects are achieved.

The airbag attachment structure 10 for attaching the airbag 4a to the instrument panel 2 includes: the door portions 40 in each of which at least one end portion 41 is provided along the cleavage line 6 of the instrument panel 2, and in each of which the one end portion 41 is opened when the airbag 4a is deployed; the attachment portion 20 to which the airbag case 4b for storing the airbag 4a is attached and which has the opening 20a at which the door portions 40 are opened and brought into an opened state when the airbag 4a is deployed; the hinge portions 30 connected to the attachment portion 20 and configured to turnably hold the respective door portions 40; the guide portion 50 protruding from the attachment portion 20 to narrow the deployment passage 8 between the airbag 4a and the door portions 40, and configured to guide deployment of the airbag 4a; and the flaps 60 one of which is connected to the guide portion 50, which are interposed between the airbag 4a and the hinge portions 30, and which are configured to turn together with the respective door portions 40 when being biased by the airbag 4a during deployment of the airbag 4a, and the guide portion 50 has higher rigidity than each of the flaps 60.

According to this configuration, the guide portion 50 provided to protrude from the attachment portion 20 to narrow the deployment passage 8 has higher rigidity than each of the flaps 60. Therefore, when the airbag 4a is inflated, the guide portion 50 having higher rigidity reduces a volume of the deployment passage 8, so that a pressure generated due to the inflation of the airbag 4a can be easily concentrated on the cleavage line 6. In addition, since the flap 60 is connected to the guide portion 50 and the flap 60 is reduced in size, even the flap 60 is bent when the airbag 4a is inflated in the deployment passage 8 below the door portions 40, the bending amount can be reduced by an amount corresponding to the reduction in size of the flap 60.

Further, in the flap 60, the both end portions 63 in the axial direction of turning have higher rigidity than the center portion 64 between the both end portions 63. Specifically, the flap 60 includes, at each of the both end portions 63, the rib 70 connected to the guide portion 50.

In this configuration, the ribs 70 are provided at the both end portions 63 of the flap 60. By providing the ribs 70, the rigidity of the both end portions 63 of the flap 60 is higher than that of the center portion 64 of the flap 60. Therefore, the flap 60 is deformed first in the vicinity of the center portion 64, and then deformed in the vicinity of the both end portions 63. Therefore, when the pressure generated due to the inflation of the airbag 4a acts, the airbag lid 5 is also first cleaved in the vicinity of the center in the lateral cleavage line portion 6a, then spreads to both ends, and after the lateral cleavage line portion 6a is cleaved, the vertical cleavage line portions 6b are cleaved. Therefore, in the airbag attachment structure 10, it is possible to cleave the cleavage line 6 in a desirable order and open the opening and closing portions 7 of the airbag lid 5 together with the door portions 40.

Further, the guide portion 50 includes a turning stopper (the inner peripheral end portion 54a) for restricting the turning of the flap 60 during deployment of the airbag 4a.

In this configuration, when the flap 60 turns, the flap 60 abuts against the inner peripheral end portion 54a of the tip portion 54 of the guide portion 50, and the turning of the flap 60 is restricted. Therefore, it is possible to prevent the force for largely deforming the flap 60 from acting.

Further, the inner peripheral end portion 54a is provided at a position away from the connection point 54b between the flap 60 and the guide portion 50 by a predetermined distance outward in a deploying direction of the airbag 4a. Specifically, the predetermined distance is a distance at least corresponding to a thickness of the flap 60.

In this configuration, the tip portion 54 is located closer to the attachment portion 20 than the connection point 54b by the thickness of the flap 60. Therefore, when the flap 60 turns and abuts against the inner peripheral end portion 54a of the tip portion 54 of the guide portion 50, the flap 60 does not protrude inside the deployment passage 8 from the guide portion 50. Therefore, it is possible to prevent the flap 60 from interfering with the inflated airbag 4a.

In addition, in the flap 60, the abutting portion 62 that abuts against the turning stopper (the inner peripheral end portion 54a) in a state where the airbag 4a is deployed is formed to be thicker than other portions.

According to this configuration, when the flap 60 turns, the abutting portion 62 formed to be thicker than other portions abuts against the inner peripheral end portion 54a of the tip portion 54 of the guide portion 50. Accordingly, it is possible to cope with a large force that acts on the flap 60 due to the impact when the flap 60 turns and abuts against the inner peripheral end portion 54a.

The guide portion 50 protrudes from the attachment portion 20 in a range not overlapping with the airbag 4a when the airbag 4a is viewed from the opening 20a.

According to this configuration, it is possible to prevent the guide portion 50 from interfering with the airbag 4 when the airbag 4a is deployed and inflated.

In addition, the guide portion 50 is provided separately from the attachment portion 20 and is attached to the attachment portion 20.

According to this configuration, the guide portion 50 can be molded separately from the attachment portion 20 integrally molded with the hinge portions 30. Therefore, for example, the attachment portion 20 and the guide portion 50 can be formed using different materials or can be formed to have different thicknesses, so that it is easy to increase the rigidity of the guide portion 50.

In addition, the free ends 61 of the flaps 60 abut against the respective door portions 40 in a state where the airbag 4a is stored, and each of the door portions 40 includes the free end stopper 42 that defines a position of the corresponding free end 61.

According to this configuration, the free ends 61 of the flaps 60 abut to the respective free end stoppers 42, so that the positions of the flaps 60 can be defined as intended. Further, since the flaps 60 are restrained by the door portions 40, rattling noise when the flaps 60 move due to vibration during traveling of the vehicle 1 can be prevented from occurring.

In addition, the pair of the door portions 40 are provided such that the respective one end portions 41 thereof face each other at positions along the cleavage line (the lateral cleavage line portion 6a), the pair of the hinge portions 30 are provided to turnably hold the respective door portions 40, the airbag 4a is inclinedly attached to the attachment portion 20 such that a distance to one of the hinge portions 30 is larger than a distance to the other of the hinge portions 30, and the guide portion 50 is attached to a position on the attachment portion 20 where the hinge portion 30 having the larger distance to the airbag 4a is connected.

In this configuration, since the airbag 4a is inclinedly attached to the attachment portion 20 such that the distance to one of the hinge portions 30 is larger than the distance to the other of the hinge portions 30, a space easily occurs between the airbag 4a and the hinge portions 30, and by using the guide portion 50 to fill the space, the pressure can be concentrated on the cleavage line (the lateral cleavage line portion 6a) when the airbag 4a is inflated in the deployment passage 8.

Although the embodiment of the present invention has been described in the above, the above-mentioned embodiment merely illustrates a part of application examples of the present invention, and the technical scope of the present invention is not intended to be limited to the specific configurations of the above-described embodiment.

Figure 9:
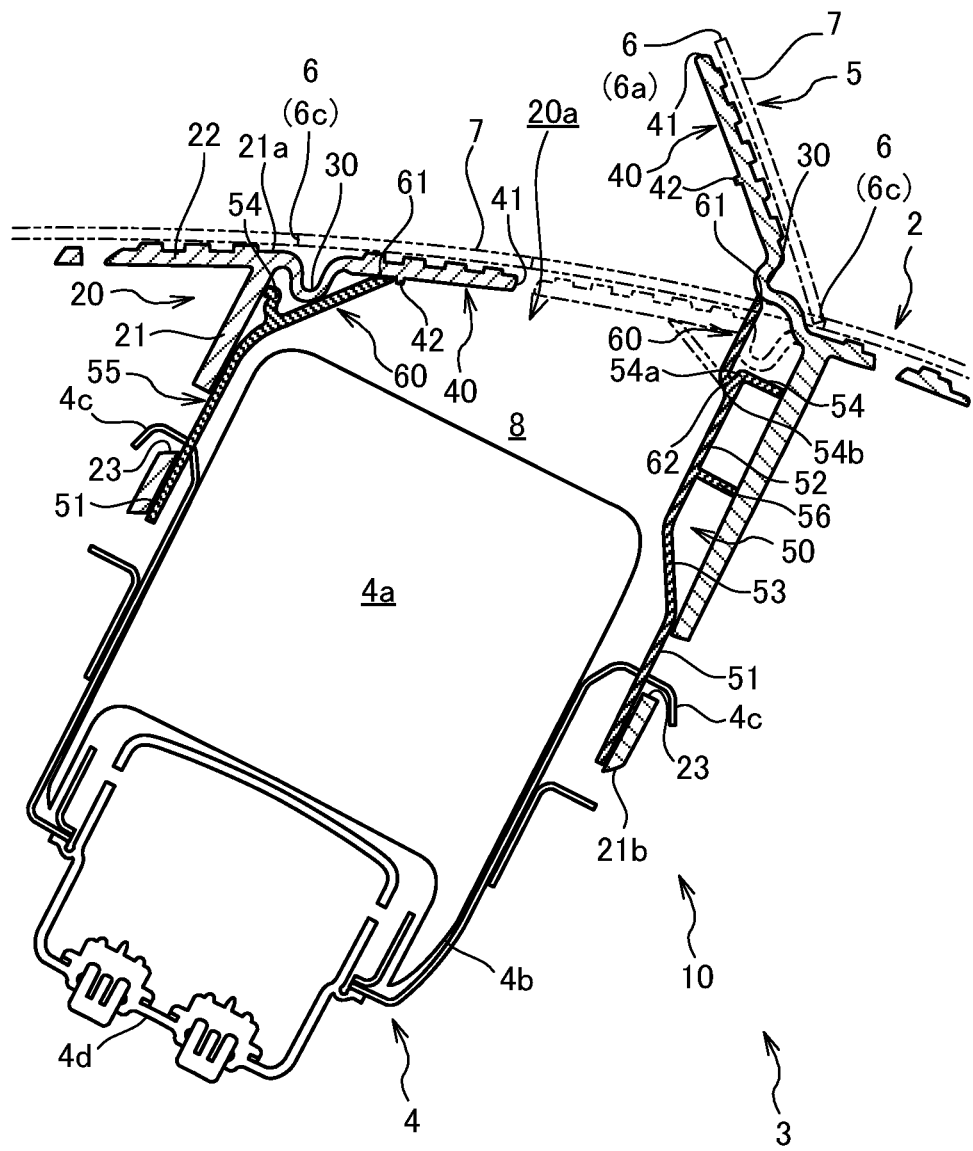
FIG. 9 is a cross-sectional view illustrating an airbag attachment structure according to a modification of the embodiment of the invention.

For example, according to the above embodiment, the tip portion 54 is located closer to the attachment portion 20 than the connection point 54b by at least the amount corresponding to the thickness of the flap 60. Instead, as in a modification illustrated in FIG. 9, a height of the tip portion 54 from the attachment portion 20 may be equal to that of the connection point 54b.

In this case, similarly, since the guide portion 50 having higher rigidity reduces the volume of the deployment passage 8, the pressure is easily concentrated on the cleavage line 6 when the airbag 4a is inflated in the deployment passage 8 below the door portions 40.

The present application claims a priority based on Japanese Patent Application No. 2021-132385 filed with the Japan Patent Office on Aug. 16, 2021, the entire content of which are incorporated into this specification by reference.

The invention claimed is:

1. An airbag attachment structure for attaching an airbag to an instrument panel, comprising:
a door portion whose at least one end portion is provided along a cleavage line of the instrument panel, and in which the one end portion is opened when the airbag is deployed;
an attachment portion to which an airbag case for storing the airbag is attached, and which has an opening at which the door portion is opened and brought into an opened state when the airbag is deployed;
a hinge portion connected to the attachment portion and configured to turnably hold the door portion;
a guide portion protruding from the attachment portion to narrow a deployment passage between the airbag and the door portion, and configured to guide deployment of the airbag; and
a flap connected to the guide portion, interposed between the airbag and the hinge portion, and configured to turn together with the door portion when being biased by the airbag during deployment of the airbag, wherein
the guide portion has higher rigidity than the flap.

2. The airbag attachment structure according to claim 1, wherein
in the flap, both end portions in an axial direction of turning have higher rigidity than a center portion between the both end portions.

3. The airbag attachment structure according to claim 2, wherein the flap has, at each of the both end portions, a rib connected to the guide portion.

4. The airbag attachment structure according to claim 1, wherein the guide portion includes a turning stopper for restricting turning of the flap during deployment of the airbag.

5. The airbag attachment structure according to claim 4, wherein the turning stopper is provided at a position away from a connection point between the flap and the guide portion by a predetermined distance outward in a deploying direction of the airbag.

6. The airbag attachment structure according to claim 5, wherein the predetermined distance is a distance at least corresponding to a thickness of the flap.

7. The airbag attachment structure according to claim 4, wherein, in the flap, an abutting portion that abuts against the turning stopper in a state where the airbag is deployed is formed to be thicker than other portions.

8. The airbag attachment structure according to claim 1, wherein the guide portion protrudes from the attachment portion in a range not overlapping with the airbag when the airbag is viewed from the opening.

9. The airbag attachment structure according to claim 1, wherein the guide portion is provided separately from the attachment portion and is attached to the attachment portion.

10. The airbag attachment structure according to claim 1, wherein
a free end of the flap abuts against the door portion in a state where the airbag is stored, and
the door portion includes a free end stopper for defining a position of the free end.

11. The airbag attachment structure according to claim 1, wherein
a pair of door portions are provided such that respective one end portions thereof face each other at positions along the cleavage line,
a pair of hinge portions are provided to turnably hold respective door portions,
the airbag is inclinedly attached to the attachment portion such that a distance to one of the hinge portions is larger than a distance to another of the hinge portions, and
the guide portion is attached to a position on the attachment portion where the hinge portion having a larger distance to the airbag is connected.

* * * * *